US007644741B2

(12) United States Patent
Moldthan et al.

(10) Patent No.: US 7,644,741 B2

(45) Date of Patent: Jan. 12, 2010

(54) GLASS FILLER

(75) Inventors: Jason R. Moldthan, Greer, SC (US); Mark V. Weaver, Columbus, NC (US); Luke Edward Langner, Greenville, SC (US)

(73) Assignee: T & S Brass and Bronze Works, Inc., Travelers Rest, SC (US)

( * ) Notice: Subject to any disclaimer, the term of this patent is extended or adjusted under 35 U.S.C. 154(b) by 682 days.

(21) Appl. No.: 11/522,115

(22) Filed: Sep. 15, 2006

(65) Prior Publication Data

US 2008/0066826 A1 Mar. 20, 2008

(51) Int. Cl.
*B65B 1/04* (2006.01)
*F16K 51/00* (2006.01)

(52) U.S. Cl. ....................... 141/362; 141/301; 141/351; 251/156

(58) Field of Classification Search ..................... 141/2, 141/301, 302, 351, 362; 251/156; 222/505–509
See application file for complete search history.

(56) References Cited

U.S. PATENT DOCUMENTS 1,512,017 A * 10/1924 Field .......................... 251/156
3,016,929 A * 1/1962 Rapaport .................... 141/263
3,455,332 A * 7/1969 Cornelius ................ 366/167.1
3,738,543 A * 6/1973 Aperlo ....................... 222/453
4,357,972 A * 11/1982 Villa .......................... 141/351
5,794,823 A * 8/1998 Roundtree ............... 222/400.7
5,845,824 A * 12/1998 Weimer et al. .............. 222/641

OTHER PUBLICATIONS

G-4 Catalogue, T&S Food Service Specialties Glass Fillers, pp. C-22 and C-23, dated 1978.
G-6 Catalogue, Totally T&S Food Service, Glass Fillers p. A26, dated 1999.
Component Hardware webpage, 1 page, dated Apr. 21, 2006, http://www.componenthardware.com/default.aspx?ref=pro&proid=1205.
Fisher Manufacturing webpage; 3 pages, dated Apr. 21, 2006, http://www.fisher-mfg.com/ProductLines.asp?categoryid=1 .
Zurn Plumbing, 1 page, dated 4=Apr. 21, 2006, http://222.zurn.com/pages/catalog.asp?ProductGroupID=40&OperationID=3#p871.

* cited by examiner

*Primary Examiner*—Timothy L Maust
(74) *Attorney, Agent, or Firm*—Dority & Manning, P.A.

(57) ABSTRACT

A glass filler defines a main body having a lower surface. An inlet and outlet are each defined in the lower surface of the main body. An outlet chamber is defined in the main body and contains an outlet valve, which includes an outlet valve housing defining a castellated edge. The outlet valve includes a cylindrical sleeve that defines an inner surface that is crenellated and configured to receive an implement that can be inserted and used by the operator to rotate the cylindrical sleeve in a manner that controls the amount of liquid exiting the outlet of the glass filler.

19 Claims, 7 Drawing Sheets

FIG. 4
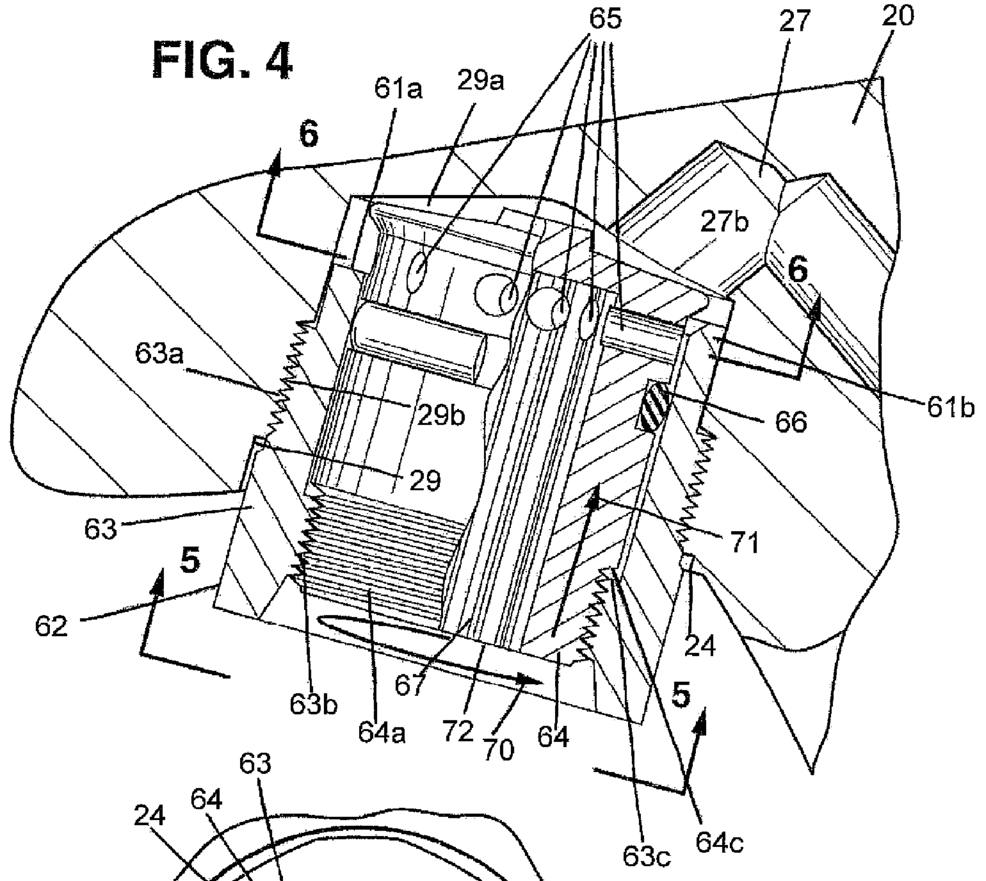
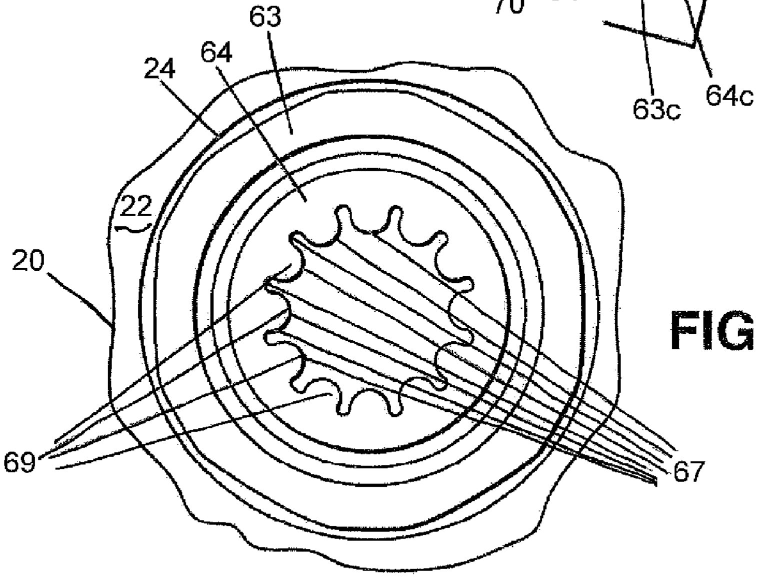
FIG. 5

GLASS FILLER

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention pertains to a glass filler that mounts to a hollow conduit that carries liquid into the glass filler for dispensing into a container that is pressed against a trigger that operates the valve controlling the flow of liquid from the conduit through the glass filler.

When not in use, glass fillers can accumulate dust and debris that can fall into the container that is being filled from liquid that is dispensed from the glass filler. The introduction of such dust and/or debris into the container is undesirable.

A typical glass filler is operated by manipulation of a trigger mechanism. Unless due care is exercised, the operator can place too much strain on the trigger mechanism and thereby cause damage to the valve mechanism that controls the dispensing of liquid from the glass filler to the container.

The valve that is controlled by the trigger that is under the control of the operator typically has a very limited range of flows and accordingly provides essentially an on/off degree of control over the flow that is dispensed from the glass filler. This is because the container that comes into contact with the trigger must be disposed within a narrow range of locations in order to be in the proper position to receive the flow of liquid from the outlet of the glass filler.

OBJECTS AND SUMMARY OF THE INVENTION

It is a principal object of the present invention to provide a glass filler that is configured to permit a greater degree of control over the volume of liquid that is dispensed per unit of time.

It is another principal object of the present invention to provide a glass filler having a stop mechanism that prevents movement of the trigger to an extent that would result in damage to the valve mechanism.

Yet another principal object of the present invention is to provide a glass filler that is configured to reduce the likelihood of contamination from dust collected on the glass filler.

It is a further principal object of the present invention to provide a glass filler that can be connected to the source of liquid via the underside or rear surface of the glass filler.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a glass filler for connection to a source of drinking water comprises a main body, an inlet valve, a trigger and an outlet valve. The main body defines an upper surface and a lower surface that is disposed opposite the upper surface. The main body defines a rear surface that extends between the upper surface and the lower surface and is disposed at the end of the main body that is generally opposite the end where the outlet valve is disposed. The main body defines an outlet through the lower surface and an inlet through either the lower surface or through the rear surface.

The inlet valve is disposed within the main body and between the inlet and the outlet. The inlet valve includes an actuator button that is biased to project outwardly from within the main body. An inlet passage is configured to connect the inlet into fluid communication with the inlet valve. An elongated arm is provided as part of the trigger and has one end that is pivotally connected to depend or hang from the lower surface of the main body. This pivotal connection desirably is disposed between the actuator button and the outlet.

An outlet passage has a first end that is connected into fluid communication with the inlet valve. The outlet passage has a second end that is disposed opposite the first end.

An outlet chamber is provided having a free end that is defined by the outlet. The outlet chamber has an interior end that is connected into fluid communication with the second end of the outlet passage. The outlet valve is disposed in the outlet chamber and is configured and disposed so as to control the flow of liquid from the outlet passage to the exit of the outlet valve.

The outlet valve includes an outlet valve housing that has a first end and a second end. The first end of the outlet valve housing defines a free edge in which is defined at least a first opening that is disposed in communication with the outlet chamber. Desirably, the first opening is formed as part of a castellated edge defined in the free edge of the outlet valve housing, and several first openings and intervening merlons are provided in the castellated edge. The outlet valve further includes a cylindrical sleeve that defines near a first end of the cylindrical sleeve at least a second opening. Desirably, the cylindrical sleeve defines a plurality of such second openings through an annular portion near the edge of the first end of the cylindrical sleeve. Desirably, the cylindrical sleeve is disposed inside the outlet valve housing so that the annular portion containing the second openings is disposed against the castellated edge portion of the outlet valve housing that defines each first opening. The cylindrical sleeve is configured to be selectively rotatable relative to the outlet valve housing. The cylindrical sleeve is configured and disposed so that rotation of the cylindrical sleeve effects a change in the area of the second opening that is hooded by the castellated edge of the outlet valve housing.

Desirably, the cylindrical sleeve of the outlet valve is configured to be biased against rotation relative to the outlet valve housing. The cylindrical sleeve desirably defines an inner surface that is configured to receive an implement that can be inserted into the cylindrical sleeve and used by the operator to apply leverage that is sufficient to overcome the anti-rotational biasing of the cylindrical sleeve relative to the outlet valve housing. Desirably, the inner surface of the cylindrical sleeve is configured to receive a hex wrench. Desirably, the cylindrical sleeve defines an inner surface that is configured with a crenellated surface. The crenellated surface desirably defines at least two crenellations and a merlon that is disposed between the two crenellations. Desirably, the second opening that is defined in the edge of the cylindrical sleeve is aligned with at least one of the two crenellations or the merlon. Desirably, the circumferential width of the merlon is about twice the circumferential width of each of the two crenellations.

The arm has a free end that is opposite the end that is pivotally connected to the lower surface of the main body.

This free end desirably is configured to cradle the side wall of a drinking glass or other container for liquid. The end of the arm that is near the end that is pivotally connected to the lower surface of the main body desirably defines a stop. The stop is configured and disposed in opposition to a portion of the lower surface of the main body. The arm further defines a cam that is disposed near the stop and that is configured to engage and depress the actuator button when the arm is pivoted so as to move the stop toward the lower surface of the main body. The stop is desirably configured to prevent movement of the cam in a manner that would damage the inlet valve.

The upper surface of the main body desirably is configured to define a single point that is vertically disposed at a reference distance from a horizontal reference plane. The horizontal reference plane desirably is a plane that is disposed beneath the lower surface of the main body. The reference distance of the aforementioned single point desirably is greater than the vertical distance between any other point on the upper surface of the main body and the reference plane.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

FIG. 4 is an expanded view of components shown partially in cross-section and partially cut away.

FIG. 5 is a plan view taken in the direction that is indicated by the arrows designated 5-5 in FIG. 4.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
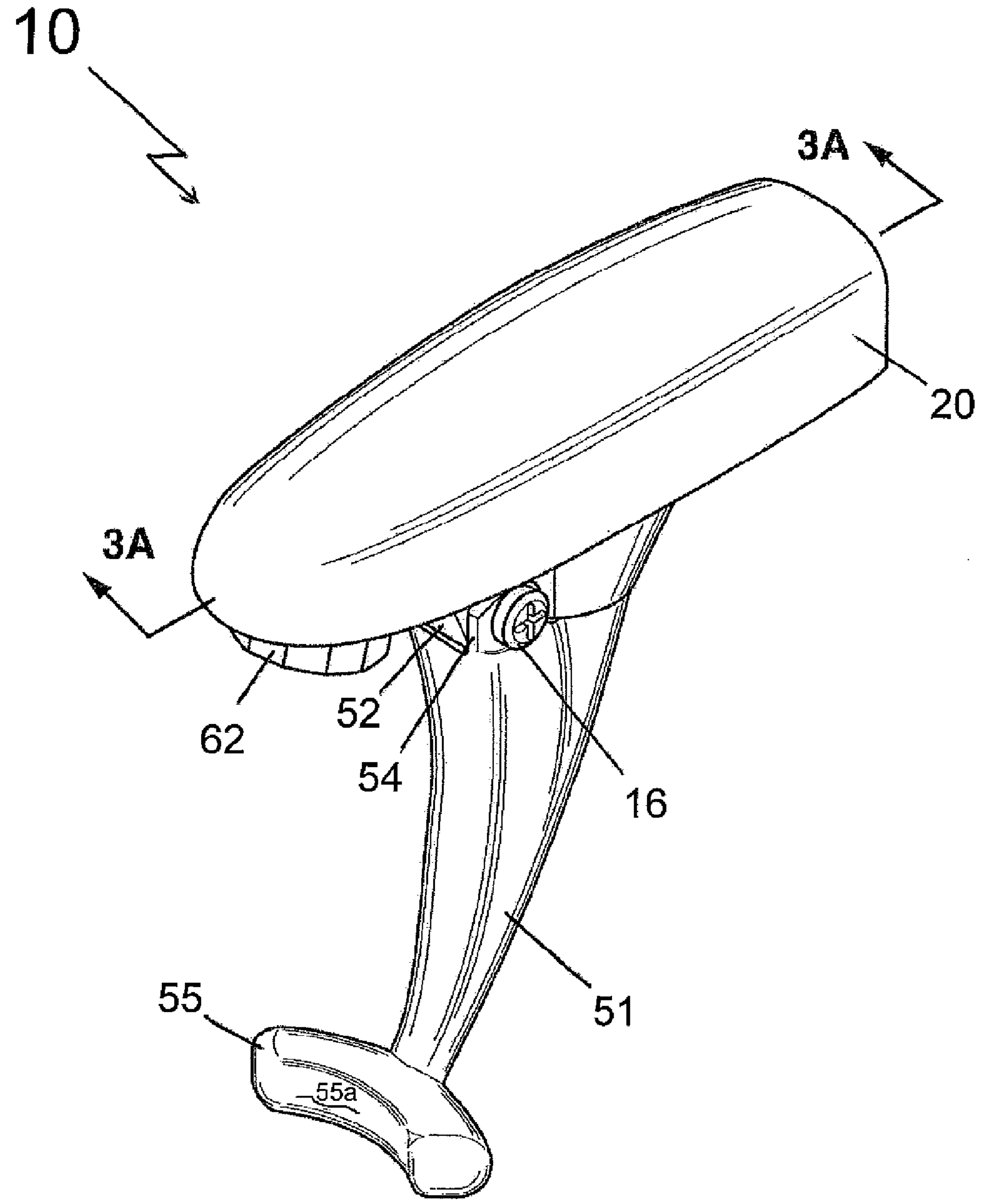
FIG. 1 is an elevated perspective view of an embodiment of the apparatus of the present invention.
Figure 2:
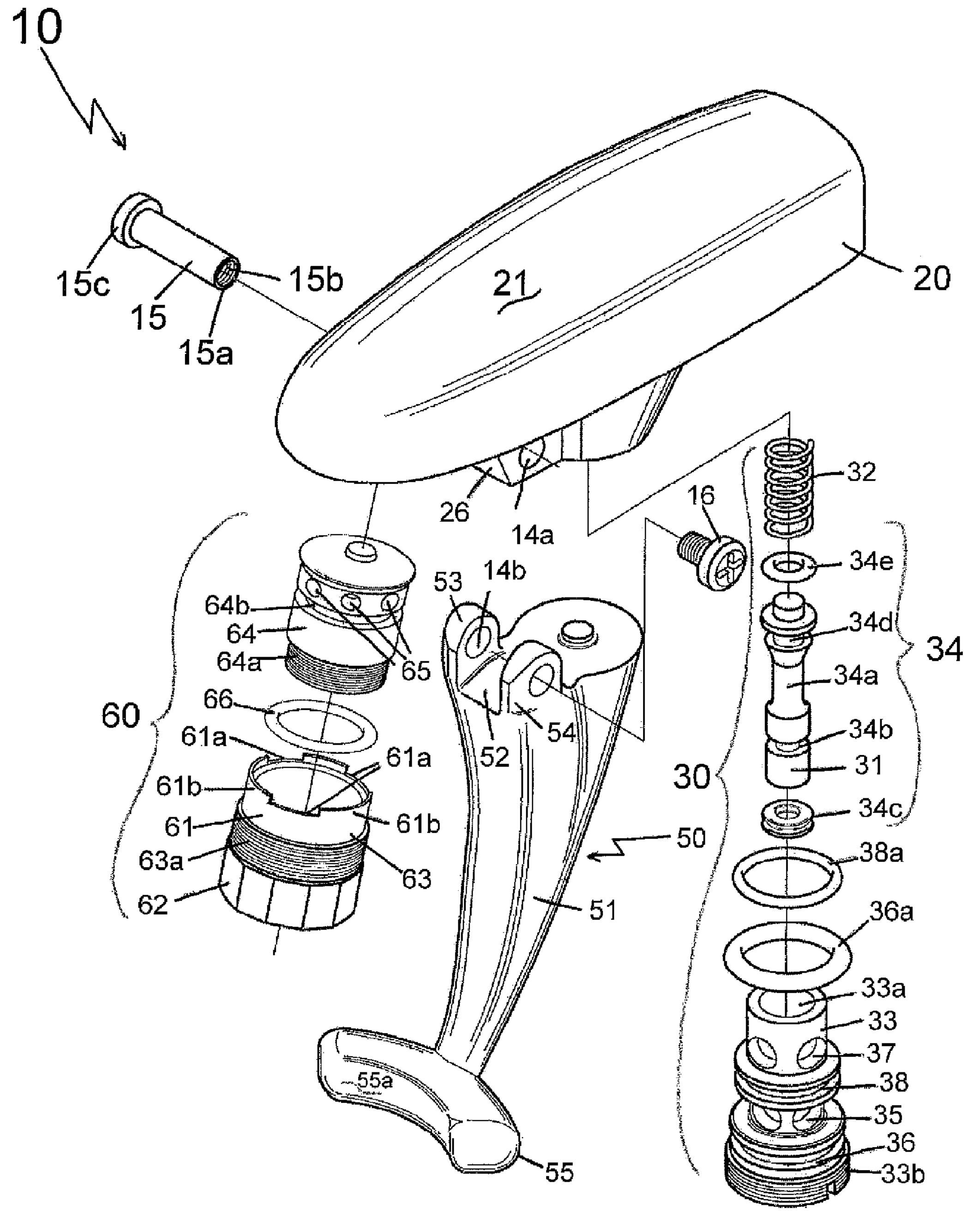
FIG. 2 is an elevated perspective view of dissembled components of an embodiment of the apparatus of the present invention.
Figure 3A:
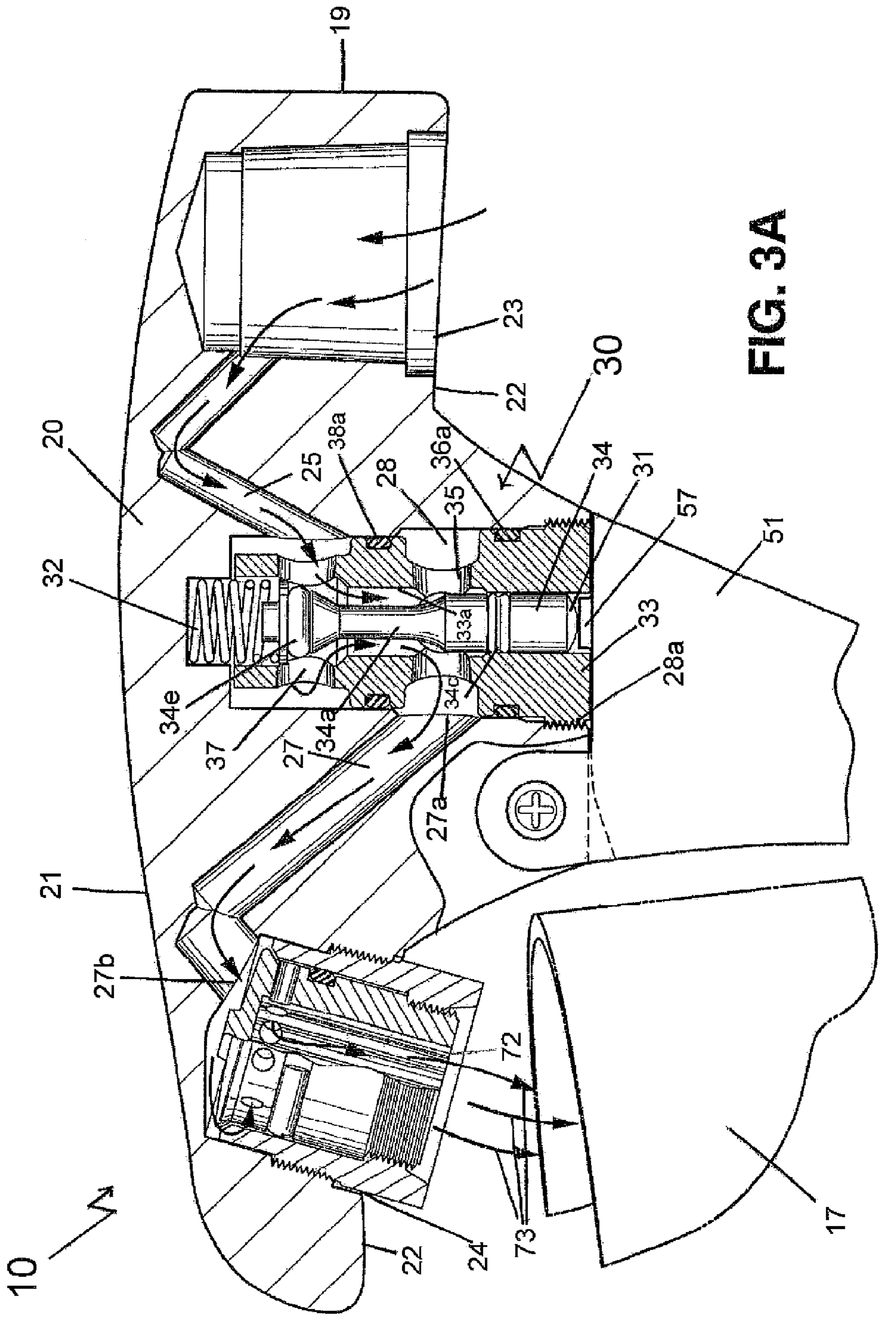
FIG. 3A is a cross-sectional view of the embodiment shown in FIG. 1 in the open mode of the inlet valve and taken along the line of sight indicated by the arrows designated 3A-3A.
Figure 7:
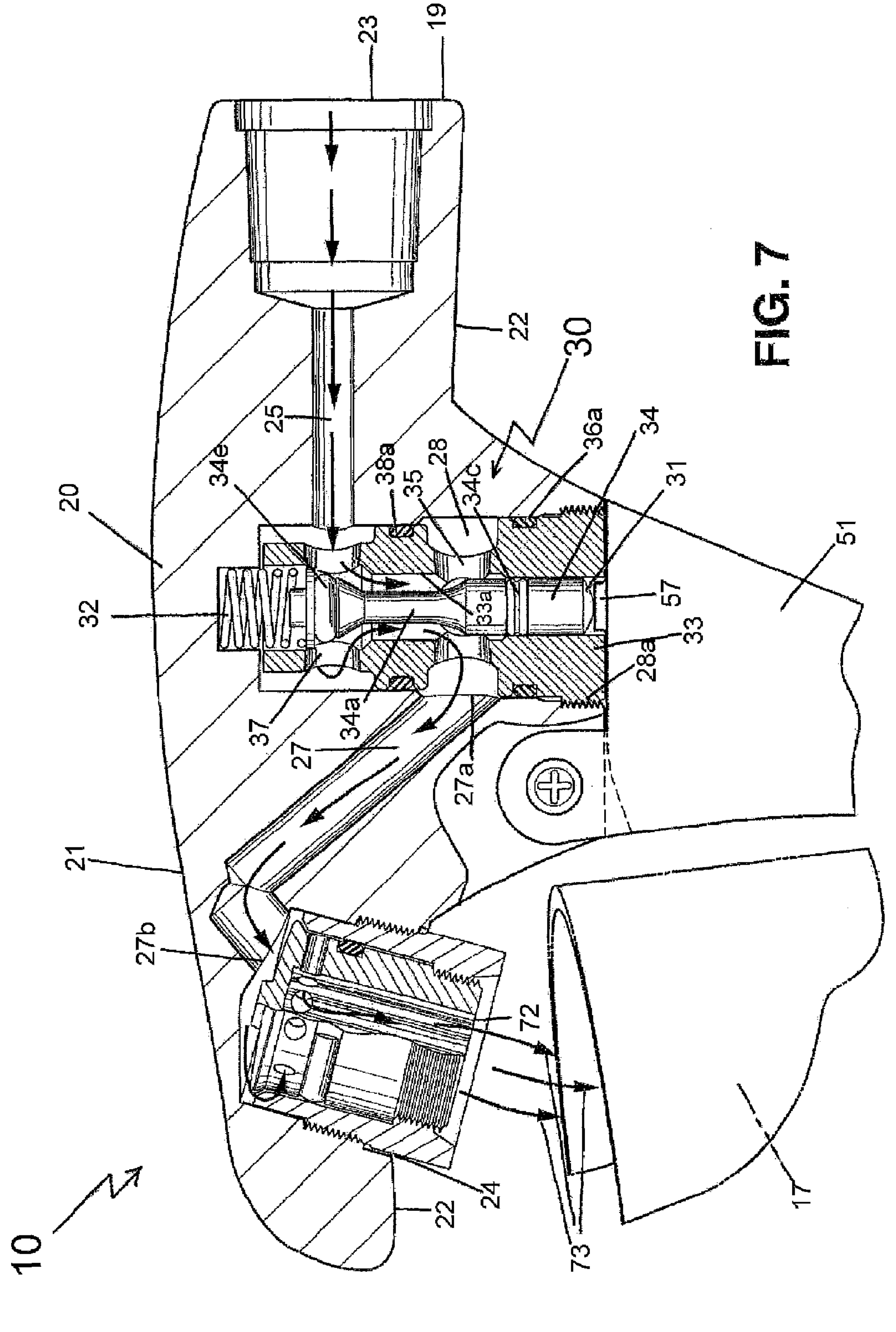
FIG. 7 is a cross-sectional view of an alternative embodiment shown in FIG. 1 in the open mode of the inlet valve and taken along the line of sight indicated by the arrows designated 3A-3A in FIG. 1.

A presently preferred embodiment of the glass filler is shown in FIG. 1 and is represented generally by the numeral 10. The glass filler 10 is configured for connection to a source of drinking water and as shown in FIG. 2, comprises a main body 20, an inlet valve 30, a trigger 50 and an outlet valve 60. As shown in FIGS. 3A and 7, the main body 20 can define an upper surface 21 and a lower surface 22 that is disposed opposite the upper surface 21. The main body can define a rear surface 19 that extends between the upper surface 21 and the lower surface 22 and is disposed at the end of the main body 20 that is generally opposite the end where the outlet valve 60 is disposed. As shown in FIG. 3A, the main body 20 can define an inlet 23 through the lower surface 22 and an outlet 24 through the lower surface 22, the latter also being illustrated in FIG. 5. In an alternative embodiment shown in FIG. 7, the main body 20 can define an inlet 23 through the rear surface 19.

The upper surface 21 of the main body desirably is configured to define a single apex point that is vertically disposed at a reference distance from a horizontal reference plane. In this way, every other point on the upper surface 21 slopes away from the apex point 11, and dust and other debris will tend to slide off of the upper surface 21 of the main body 20 rather than accumulating thereon. As shown in the cross-sectional view of FIG. 3B, a suitable horizontal reference plane is schematically indicated by the line designated by the numeral 12. The horizontal reference plane 12 desirably is a plane that is disposed beneath the lower surface 22 of the main body 20. The vertically measured reference distance 13 of the aforementioned single apex point 11 desirably is greater than the vertical distance between the reference plane 12 and any other point on the upper surface 21 of the main body 20.

Figure 3B:
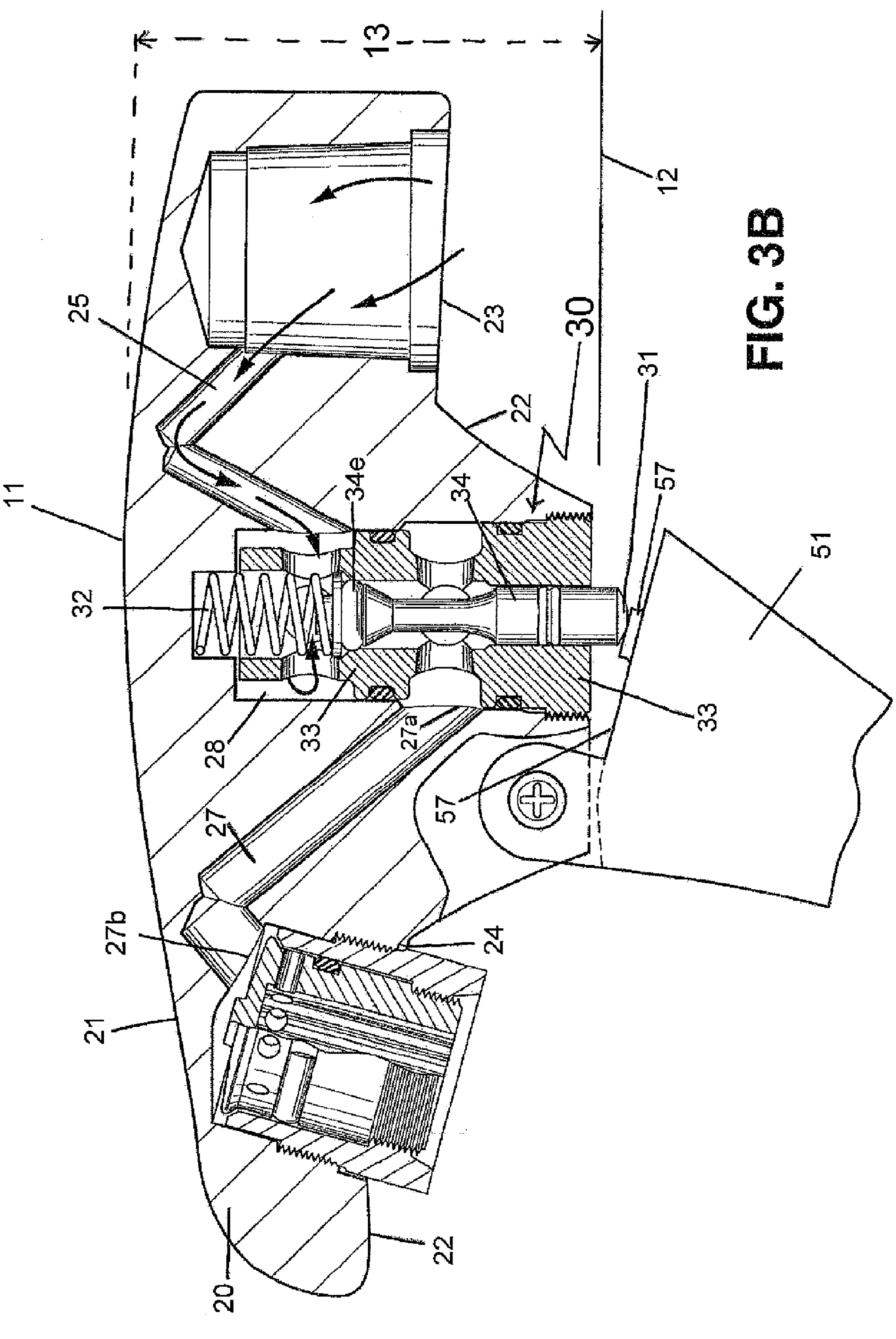
FIG. 3B is a cross-sectional view of the embodiment shown in FIG. 1 in the closed mode of the inlet valve and taken along the line of sight indicated by the arrows designated 3A-3A.

As shown in FIGS. 3A and 7, the inlet valve 30 is disposed within the main body 20 and between the inlet 23 and the outlet 24. As shown in FIGS. 3A, 3B and 7, an elongated cylindrical recess 28 is formed in the main body 20 of the glass filler 10 and configured to receive therein, the inlet valve 30. An inlet passage 25 is formed in the main body 20 of the glass filler 10 and configured to connect the inlet 23 into fluid communication with the cylindrical recess 28 and the inlet valve 30. As shown in FIGS. 3A, 3B and 7, an outlet passage 27 is defined within the main body 20 and is configured with a first end 27*a* that is connected into fluid communication with the cylindrical recess 28 and the inlet valve 30. The outlet passage 27 has a second end 27*b* that is disposed generally opposite the first end 27*a*.

As shown in FIG. 3B, the inlet valve 30 desirably can include an axially elongated piston 34. As shown in FIG. 2, the piston 34 desirably defines intermediate along its axial length, a reduced diameter portion 34*a* that plays a role in regulating the flow of fluid past the piston 34 when the reduced diameter portion 34*a* is disposed in the flow path of the fluid that moves through the inlet valve 30. At one end of the piston, the piston 34 desirably defines an actuator button 31. A first annular groove 34*b* that is configured for receiving a first O-ring 34*c* desirably can be formed in the piston 34 between the actuator button 31 and the reduced diameter portion 34*a*. Near the end of the piston 34 opposite from the actuator button 31, the piston 34 can be configured to define a second annular groove 34*d*, which desirably is formed between the end opposite the actuator button 31 and the reduced diameter portion 34*a* and is configured for receiving therein a second O-ring 34*e*.

As shown in FIG. 2, the inlet valve 30 also desirably can include an axially extending cylindrical member 33 that has a cylindrically shaped interior wall 33*a* that defines a hollowed out interior space that is configured to slidably receive therein the piston 34. The cylindrical member 33 has an exterior that is configured to be received within the elongated cylindrical recess 28 that is formed in the main body 20 of the glass filler 10.

As shown in FIG. 2, the exterior surface of one end of the cylindrical member 33 is desirably configured with a threaded portion 33*b*. The threaded portion 33*b* of the cylindrical member 33 can be desirably configured to mate with a threaded portion 28*a* near the entrance to the cylindrical recess 28 that is formed in the main body 20 and indicated in FIGS. 3A and 7 for example. This enables the cylindrical member 33, and hence the inlet valve 30, to be screwed into the cylindrical recess 28 that is formed in the main body 20.

As shown in FIG. 2, the cylindrical member 33 desirably has defined radially therethrough a first set of holes 35 that extend from the exterior surface of the cylindrical member 33 and through the interior wall 33*a* and into the hollow interior of the cylindrical member 33. As shown in FIG. 2, a first annular groove 36 is defined in the exterior surface of the cylindrical member 33 and disposed between the first set of radial holes 35 and the threaded exterior end 33*b* of the cylindrical member 33. The cylindrical member 33 further defines a second set of holes 37 that extend radially from the exterior surface of the cylindrical member 33 through the interior wall 33*a* and into the interior of the cylindrical member 33. The cylindrical member 33 further defines a second annular groove 38 that is disposed between the first and second sets of radially extending holes 35, 37, respectively. As shown in FIGS. 3A and 7 for example, a first O-ring 36*a* is configured and disposed in the first annular groove 36, and a second O-ring 38*a* is configured and disposed in the second annular groove 38 in the cylindrical member 33.

Each of FIGS. 3A and 7 shows the glass filler 10 with the inlet valve 30 oriented so as to permit fluid to flow from the inlet 23, through the inlet valve 30 and into a waiting glass 17 to be filled. The water leaving the glass filler 10 and entering glass 17 is schematically indicated by the arrows that are designated 73. As shown in FIGS. 3A and 7 for example, the second set of radially extending holes 37 through the cylindrical member 33 of the inlet valve 30 is disposed in liquid flow communication with both the cylindrical recess 28 and the inlet passage 25 in the main body 20. Moreover, the first set of radially extending holes 35 through the cylindrical member 33 of the inlet valve 30 is disposed in liquid flow communication with the cylindrical recess 28 and with the outlet passage 27 in the main body 20.

As shown in FIGS. 3A, 3B and 7 for example, the actuator button 31 is biased to project outwardly from within the main body 20. The biasing of the actuator button 31 desirably can be accomplished by a resilient spring 32, which desirably can have one end disposed against the end of the piston 34 that is opposite the actuator button 31. The opposite end of the spring 32 is butted against the main body 20.

As shown in FIGS. 3A and 7, an elongated arm 51 is provided as part of the trigger 50 and has one end that is pivotally connected to the main body 20 near the lower surface 22 thereof. As shown in FIG. 3B, this pivotal connection desirably is disposed between the actuator button 31 and the outlet 24. As shown in FIG. 2, the pivotal connection desirably is formed by inter-fitting a tongue 26 between the groove 52 that is defined by a pair of opposed projecting members 53, 54. The tongue 26 can be defined to project from the lower surface 22 of the main body 20 and can be formed as a member that is unitary with the main body 20. The projecting members 53, 54 can be formed on one end of the arm 51 and disposed in opposition and spaced apart from each other. Each of the projecting members 53, 54 can be formed as a member that is unitary with the trigger 50. The tongue 26 and each of the projecting members 53, 54 have defined therethrough an aligned through hole 14*a*, 14*b*, 14*c*, respectively.

As shown in FIG. 2, a hollow trunnion 15 can be provided with an opening 15*a* on one free end thereof, and the opening 15*a* can lead to a threaded interior surface 15*b*. The opposite end of the trunnion 15 can be provided with a head 1 5*c* that is larger in diameter than the diameter of any of the through holes 14*a*, 14*b*, 14*c* in the tongue 26 and projecting members 53, 54. The free end of the trunnion 15 can be inserted through the through holes 14*a*, 14*b*, 14*c* in the tongue 26 and projecting members 53, 54. A bolt 16 can be provided with a shaft that has an exterior surface 16*a* that is threaded and configured to be screwed into the threaded interior surface 15*b* of the trunnion 15 and thereby close the free end of the trunnion 15.

The arm 51 has a free end that is opposite the end that is pivotally connected to the lower surface 22 of the main body 20. This free end desirably can be configured to cradle the side wall of a drinking glass or other container for liquid. As shown in FIG. 2, the free end of the arm 51 defines a cradle member 55 having a curved surface 55*a* that is configured to follow the curvature of a glass that is to be filled by the glass filler 10. As shown in FIG. 2, the end of the arm 51 that is near the end that is pivotally connected to the lower surface 22 of the main body 20 desirably defines an arm stop 56. The arm stop 56 desirably is disposed generally between the projecting members 53, 54 and the cradle 55. More particularly, the arm stop 56 desirably is configured and disposed in opposition to a portion of the lower surface 22 of the main body 20. The arm 51 further defines a cam 57 that is disposed near the arm stop 56 and that is configured to engage and depress the actuator button 31 when the arm 51 is pivoted so as to move the arm stop 56 toward the lower surface 22 of the main body 20. The arm stop 56 is desirably configured to prevent movement of the cam 57 in a manner that would damage the inlet valve 30.

In the view shown in FIG. 3B, the second O-ring 34*e* of the piston 34 blocks any flow of fluid from the inlet passage 25 to the hollow interior of the cylindrical member 33 of the inlet valve 30, and thus there is no flow path from the inlet passage 25 to the outlet passage 27. As shown in FIGS. 3A and 7 and schematically indicated by the arrows, with the actuator button 31 depressed by the cam 57 of arm 51, the piston 34 is disposed so that there is direct fluid communication between the inlet passage 25 and the outlet passage 27 via the first and second set of radially extending holes 35, 37, respectively.

This direct fluid communication proceeds through the cylindrical member 33 and past the reduced diameter portion 34*a* of the piston 34 that defines an annular space between the reduced diameter portion 34*a* and the interior surface 33*a* that defines the hollow interior of the cylindrical member 33 of the inlet valve 30.

As shown in FIG. 4, an outlet chamber 29 is defined in the main body 20, and the outlet 24 defines the free end of the outlet chamber 29. The outlet chamber 29 desirably is cylindrical in configuration and has an interior end 29*a* that is connected into fluid communication with the second end 27*b* of the outlet passage 27. An intermediate cylindrical section of the outlet chamber 29 is defined by a threaded portion 29*b*.

As shown in FIG. 2, the outlet valve 60 includes a valve housing 63 that has a first end 61 and a second end 62. The first end 61 of the valve housing 63 defines a free edge that is castellated, and the castellated edge defines at least a first opening 61*a* and desirably defines a plurality of such first openings 61*a*, three being shown in the embodiment shown in FIG. 2. Taken together, the three openings 61*a* desirably span about half of the circumference of the castellated edge of the valve housing 63. Each opening 61*a* in the free edge at the first end 61 is separated by a merlon 61*b*. Each of the first openings 61*a* is disposed in communication with the outlet chamber 29 and in particular with the interior end 29*a* that is connected into fluid communication with the second end 27*b* of the outlet passage 27.

As shown in FIG. 2, the second end 62 of the valve housing 63 defines a plurality of flat facets that lend themselves to being gripped by the fingers of the user. The exterior surface that is disposed between the first and second ends 61, 62 of the valve housing 63 defines an intermediate threaded portion 63*a*. As shown in FIG. 4, the intermediate threaded portion 63*a* of the valve housing 63 is configured to mate with and be screwed into the intermediate threaded section 29*b* that is formed in the cylindrical wall that defines part of the outlet chamber 29. It is by means of this threaded connection that the outlet valve 60 is disposed in the outlet chamber 29 of the main body 20 of the glass filer 10 and is configured and disposed so as to control the flow of liquid from the outlet passage 27 to the outlet 24.

Figure 6:
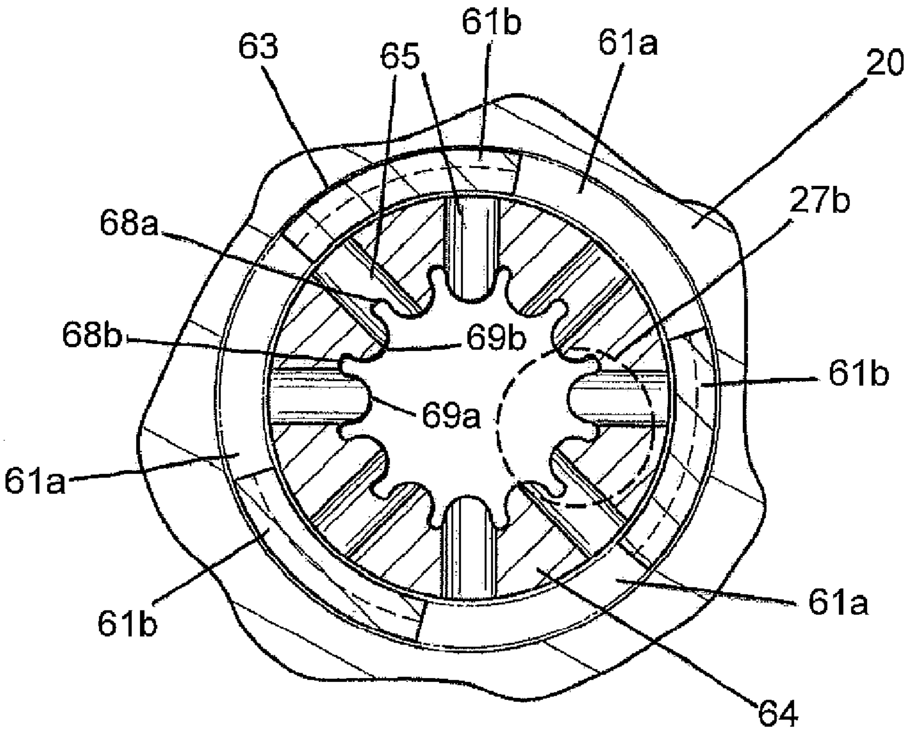
FIG. 6 is a cross-sectional view taken in the direction in which the arrows designated 6-6 are pointing in FIG. 4 and with features shown in dashed line because those features would not be visible in the plane in which the cross-section is taken.

As shown in FIG. 2, the outlet valve 60 further includes a cylindrical sleeve 64 that defines near a first end of the cylindrical sleeve 64 at least a second opening 65. Desirably, the cylindrical sleeve 64 defines a plurality of such second openings 65 through an annular portion near the edge of the first end of the cylindrical sleeve 64, three such second openings 65 being visible in the view of the embodiment shown in FIG. 2 and five being visible in the view of the embodiment shown in FIG. 4. As shown in FIG. 6, a total of eight openings 65 can be provided in an embodiment of the cylindrical sleeve 64. Each of the second openings 65 has its axis aligned radially through the cylindrical wall that defines the cylindrical sleeve 64.

As shown in FIG. 2, a threaded section 64*a* is defined in the exterior surface of the opposite end of the cylindrical sleeve 64. As shown in FIG. 2, a circumferential groove 64*b* is defined in the exterior surface of the cylindrical sleeve 64 between the second openings 65 and the threaded section 64*a*. As shown in FIG. 2, the circumferential groove 64*b* is configured to receive therein a frictionally sealing O-ring 66.

As shown in FIG. 4, the cylindrical sleeve 64 is disposed inside the outlet valve housing 63 so that the first end of the sleeve 64 having the second openings 65 is disposed against the castellated edge of the valve housing 63 that defines at least one of the first openings 61*a* (not visible in the view shown in FIG. 4). The cylindrical sleeve 64 is configured to be selectively, rotatable relative to the outlet valve housing 63. As shown in FIG. 4, the threaded section 64*a* in the cylindrical exterior surface of the cylindrical sleeve 64 is configured to mate with and be screwed into the threads that are defined in the threaded section 63*b* of the interior surface of the outlet valve housing 63 in the second end of the outlet valve housing 63. As shown in FIG. 4, the cylindrical sleeve 64 defines an exit 72 of the outlet valve 60. The exit 72 desirably is disposed axially apart from the first end that defines the second openings 65 of the cylindrical sleeve 64.

The cylindrical sleeve 64 is configured to be biased against rotation relative to the outlet valve housing 63, and this can be accomplished by the frictionally sealing O-ring 66. The cylindrical sleeve 64 is configured and disposed so that rotation of the cylindrical sleeve 64 effects a change in the degree to which at least one of the merlons 61 b defined in the castellated edge of the outlet valve housing 63 covers or hoods at least one of the second openings 65 that are defined in the cylindrical sleeve 64. The merlon 69 that is disposed in opposition to any given second opening 65 will completely cover that second opening 65 or cover or hood less than the entire are of the second opening 65, depending on the relative axial positions of the outlet valve housing 63 and cylindrical sleeve 64.

Desirably, as shown in FIG. 5, the cylindrical sleeve 64 defines an inner surface 67 that is configured to receive an implement that can be inserted into the cylindrical sleeve 64 and used by the operator to apply leverage that is sufficient to overcome the anti-rotational biasing of the cylindrical sleeve 64 relative to the outlet valve housing 63. In the embodiment used for purposes of illustrating the invention, that anti-rotational biasing of the cylindrical sleeve 64 relative to the outlet valve housing 63 is supplied by the frictionally sealing O-ring 66.

Desirably, the inner surface 67 of the cylindrical sleeve 64 is configured to receive a hex wrench. As shown in FIG. 5, the cylindrical sleeve 64 desirably defines an inner surface 67 that is formed by the end points of the merlons 69 or projections that form parts of a crenellated surface. As shown in FIG. 6, the crenellated surface desirably defines at least two crenellations 68*a*, 68*b* or indentations and a merlon 69*b* or projection that is disposed between the two crenellations 68*a*, 68*b*. In the embodiment shown in FIGS. 5 and 6, there are twelve crenellations 68 and twelve merlons 69 forming the crenellated surface. Desirably, as shown in FIG. 6, at least one of the second openings 65 that is defined in an annular portion near the edge of the first end of the cylindrical sleeve 64 is aligned with at least one of the two crenellations 68*a*, 68*b* or the merlon 69*a*. Desirably, as schematically shown in FIG. 6, the circumferential width of the merlon 69*b* is about twice the circumferential width of each of the two crenellations 68*a*, 68*b*.

Referring to FIG. 4, when the implement (not shown) is inserted and contacts the inner surface 67 of the cylindrical sleeve 64, the implement can be used to rotate the cylindrical sleeve 64 relative to the outlet valve housing 63. One such direction of rotation of the cylindrical sleeve 64 relative to the outlet valve housing 63 is schematically indicated by the arrow designated 70. The cylindrical sleeve 64 also can be rotated in the opposite direction to arrow 70 relative to the outlet valve housing 63.

Because of the mating threaded portion 64*a* and threaded section 63*b* of the respective cylindrical sleeve 64 and outlet valve housing 63, rotation of the cylindrical sleeve 64 relative to the outlet valve housing 63 results in axial movement of the cylindrical sleeve 64 relative to the outlet valve housing 63, either in the direction of the arrow designated 71 or in the opposite direction. Movement axially in the direction opposite to the direction of arrow 71 is limited as shown in FIG. 4 by the butting of stop edge 64*c* of the cylindrical sleeve 64 against the stop edge 63*c* of the outlet valve housing 63.

As shown in FIGS. 4 and 6, half of the total number of second openings 65 in the cylindrical sleeve 64 is in opposition to the merlons 61*b* that are formed in the castellated edge of the outlet valve housing 63. The other half of the total number of second openings 65 in the cylindrical sleeve 64 are in opposition to the openings 61*a* that are formed in the castellated edge of the outlet valve housing 63.

As shown in FIG. 4, when the stop edge 64*c* of the cylindrical sleeve 64 is butting against the stop edge 63*c* of the outlet valve housing 63, then the half of the number of second openings 65 in the cylindrical sleeve 64 that are in opposition to the merlons 61 b formed in the castellated edge of the outlet valve housing 63, are completely covered or hooded by the merlons 61 b. In other words, the entire areas of the second openings 65 are covered by the merlons 61 b. This is the configuration of the outlet valve 60 that permits the least amount of flow from the second end 27*b* of the outlet passage 27 to reach the exit 72 of the outlet valve 60.

When the cylindrical sleeve 64 is rotated so as to move axially in the direction of arrow 71 in FIG. 4, which is toward the interior end 29*a* of the outlet chamber 29, then increasing portions of the area of each of the second openings 65 in the cylindrical sleeve 64 that are in opposition to the merlons 61 b becomes uncovered or unhooded by the merlons 61 b. Thus, the flow exiting the second end 27*b* of the outlet passage 27 has increasing access to the uncovered areas of the second openings 65 in the cylindrical sleeve 64 that are in opposition to the merlons 61*b*. Accordingly, the total flow through all of the second openings 65 that is discharged out of the exit 72 of the cylindrical sleeve 64 is commensurately greater when the cylindrical sleeve 64 is oriented so as to expose to the flow of fluid, more of the areas of the second openings 65 that are in opposition to the merlons 61*b* of the castellated edge of the outlet valve housing 63. Reversing this condition of the orientation of the cylindrical sleeve 64 relative to the outlet valve housing 63 and the interior end 29*a* of the outlet chamber 29 results in a relative reduction in the rate of the flow that leaves the exit 72 of the cylindrical sleeve 64. Thus, it can be said that rotation of the cylindrical sleeve 64 effects a change in the amount of flow that exits the glass filler 10 from the exit 72 of the outlet valve 60.

While at least one presently preferred embodiment of the invention has been described using specific terms, such description is for illustrative purposes only, and it is to be understood that changes and variations may be made without departing from the spirit or scope of the following claims.

What is claimed is:

1. A glass filler for connection to a source of drinking water, comprising:

a main body defining an upper surface and a lower surface disposed opposite the upper surface, said main body further defining a rear surface extending generally between said upper surface and said lower surface;

an inlet defined through one of said the lower surface and said rear surface of the main body;

an outlet defined through the lower surface of the main body;

an inlet valve disposed within the main body and between the inlet and outlet, the inlet valve defining an actuator button that is biased to project outwardly from within the main body;

an inlet passage connecting the inlet into fluid communication with the inlet valve;

an elongated arm having one end pivotally connected to the lower surface of the main body and disposed between the actuator button and the outlet;

an outlet passage having a first end connected into fluid communication with the inlet valve and a second end disposed opposite to said first end;

an outlet chamber having a free end defined by said outlet, the outlet chamber having an interior end connected into fluid communication with the second end of said outlet passage;

an outlet valve disposed in said outlet chamber and including an outlet valve housing defining on one free end thereof a castellated edge portion defining at least a first opening disposed in communication with said outlet chamber, said outlet valve including a cylindrical sleeve defining through a first end thereof at least a second opening, said cylindrical sleeve being disposed in said outlet valve housing with said first end disposed against said castellated edge portion of said outlet valve housing, said cylindrical sleeve defining an exit of said outlet valve, said exit of said cylindrical sleeve being disposed axially apart from said first end of said cylindrical sleeve, said cylindrical sleeve being configured to be selectively rotatable relative to said outlet valve housing, wherein rotation of said cylindrical sleeve effects a change in the degree of flow permitted through said exit of said outlet valve.

2. A glass filler as in claim 1, wherein:

rotation of said cylindrical sleeve effects a change in the area of said second opening that is hooded by said castellated edge portion of said outlet valve housing.

3. A glass filler as in claim 1, wherein:

said cylindrical sleeve is configured to be biased against rotation relative to said outlet valve housing and said cylindrical sleeve defines an inner surface that is configured to receive an implement that can be inserted and used by the operator to apply leverage sufficient to overcome the anti-rotational biasing of the cylindrical sleeve relative to the outlet valve housing.

4. A glass filler as in claim 3, wherein:

said inner surface of the cylindrical sleeve is configured to receive a hex wrench that can be inserted and used by the operator to apply leverage sufficient to overcome the anti-rotational biasing of the cylindrical sleeve relative to the outlet valve housing.

5. A glass filler as in claim 1, wherein:

said cylindrical sleeve defines an inner surface that is configured with a crenellated surface.

6. A glass filler as in claim 5, wherein:

said crenellated surface defines at least two crenellations and a merlon disposed between said two crenellations, said second opening defined in said edge of said cylindrical sleeve being aligned with at least one of said two crenellations.

7. A glass filler as in claim 5, wherein:

said cylindrical sleeve is configured to be biased against rotation relative to said outlet valve housing and wherein the crenellated surface of the cylindrical sleeve is further configured to receive an implement that can be inserted and used by the operator to apply leverage sufficient to overcome the anti-rotational biasing of the cylindrical sleeve relative to the outlet valve housing.

8. A glass filler as in claim 7, wherein:

the crenellated surface of the cylindrical sleeve is configured to receive a hex wrench that can be inserted and used by the operator to apply leverage sufficient to overcome the anti-rotational biasing of the cylindrical sleeve relative to the outlet valve housing.

9. A glass filler as in claim 1, wherein:

the arm defines an arm stop that is disposed in opposition to a portion of the lower surface of the main body, the arm further defines a cam that is disposed near the arm stop and that is configured to engage and depress the actuator button when the arm is pivoted so as to move the stop toward the lower surface of the main body.

10. A glass filler as in claim 1, wherein:

the upper surface of the main body is configured to define a single point that is vertically disposed at a reference distance from a horizontal reference plane, which is disposed beneath the lower surface of the main body, that is greater than the vertical distance between any other point on the upper surface of the main body and the reference plane.

11. A glass filler as in claim 1, wherein said inlet is defined through said lower surface of said main body.

12. A glass filler for connection to the open end of a hollow, vertically disposed stanchion that carries drinking water vertically upward to the open end of the stanchion, comprising:

a main body defining an upper surface and a lower surface disposed opposite the upper surface;

an inlet defined through the lower surface of the main body, the inlet being configured to be selectively connected to the open end of the stanchion;

an outlet defined through the lower surface of the main body;

an inlet valve disposed within the main body and between the inlet and outlet, the inlet valve defining an actuator button that is biased to project outwardly from within the main body;

an inlet passage connecting the inlet into fluid communication with the inlet valve;

an elongated arm having one end pivotally connected to the lower surface of the main body and disposed between the actuator button and the outlet, the arm defining an arm stop that is disposed in opposition to a portion of the lower surface of the main body, the arm defining a cam disposed near the arm stop and configured to engage and depress the actuator button when the arm is pivoted so as to move the arm stop toward the lower surface of the main body;

an outlet passage having a first end connected into fluid communication with the inlet valve and a second end disposed opposite to said first end;

an outlet chamber having a free end defined by said outlet, the outlet chamber having an interior end connected into fluid communication with the second end of said outlet passage;

an outlet valve disposed in said outlet chamber and configured and disposed to control the flow from said outlet passage to said outlet;

said outlet valve including an outlet valve housing having an exterior surface that is connected to said outlet chamber, the outlet valve housing having on a free end thereof a castellated edge portion defining a plurality of circumferentially spaced apart first openings disposed in communication with said outlet chamber, said castellated edge portion further defining at least one merlon between two of said first openings;

said outlet valve including a cylindrical sleeve defining through a first end thereof a plurality of circumferentially spaced apart second openings, said cylindrical sleeve being disposed in said outlet valve housing with the first end with said plurality of circumferentially spaced apart second openings being disposed against said castellated edge portion of said outlet valve housing that defines the plurality of circumferentially spaced apart first openings, said cylindrical sleeve being configured to be selectively rotatable relative to said outlet valve housing wherein said outlet valve is configured so that rotation of said cylindrical sleeve effects a change in the area of at least one of said second openings that is hooded by said at least one merlon of said castellated edge of said outlet valve housing.

13. A glass filler as in claim 12, wherein:

said cylindrical sleeve is configured to be biased against rotation relative to said outlet valve housing and said cylindrical sleeve defines an inner surface that is configured to receive an implement that can be inserted and used by the operator to apply leverage sufficient to overcome the anti-rotational biasing of the cylindrical sleeve relative to the outlet valve housing.

14. A glass filler as in claim 12, wherein:

said cylindrical sleeve defines an inner surface that is configured with a crenellated surface.

15. A glass filler as in claim 14, wherein:

said crenellated surface defines a plurality of crenellations and a plurality of merlons, each merlon being disposed between two different adjacent ones of said crenellations, each of the second openings defined in said edge of said cylindrical sleeve being aligned with a different one of the crenellations.

16. A glass filler as in claim 15, wherein:

the circumferential width of each merlon is about twice the circumferential width of each of the two crenellations on each opposite side of that merlon.

17. A glass filler as in claim 14, wherein:

said cylindrical sleeve is configured to be biased against rotation relative to said outlet valve housing and wherein the crenellated surface of the cylindrical sleeve is further configured to receive an implement that can be inserted and used by the operator to apply leverage sufficient to overcome the anti-rotational biasing of the cylindrical sleeve relative to the outlet valve housing.

18. A glass filler as in claim 17, wherein:

the crenellated surface of the cylindrical sleeve is configured to receive a hex wrench that can be inserted and used by the operator to apply leverage sufficient to overcome the anti-rotational biasing of the cylindrical sleeve relative to the outlet valve housing.

19. A glass filler as in claim 12, wherein:

the upper surface of the main body is configured to define a single point that is vertically disposed at a reference distance from a horizontal reference plane, which is disposed beneath the lower surface of the main body, that is greater than the vertical distance between any other point on the upper surface of the main body and the reference plane.

* * * * *

UNITED STATES PATENT AND TRADEMARK OFFICE

CERTIFICATE OF CORRECTION

PATENT NO. : 7,644,741 B2
APPLICATION NO. : 11/522115
DATED : January 12, 2010
INVENTOR(S) : Moldthan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this

Sixteenth Day of November, 2010

David J. Kappos
*Director of the United States Patent and Trademark Office*